Patented May 26, 1936

2,041,783

UNITED STATES PATENT OFFICE 2,041,783

METHOD FOR PRODUCING A SYNTHETIC RESIN

George W. Seymour, Cumberland, Md., assignor to Celanese Corporation of America, a corporation of Delaware No Drawing. Application April 16, 1932, Serial No. 605,788

2 Claims. (Cl. 260—2)

This invention relates to the preparation of a synthetic resin by the polymerization of a condensation product formed by the reaction of an aromatic aldehyde with a ketone, and also to coating or plastic compositions containing derivatives of cellulose and particularly organic derivatives of cellulose.

An object of my invention is to prepare a synthetic resin that is compatible with derivatives of cellulose, and therefore suitable for use in films, lacquers or other coating compositions or plastics containing such derivatives of cellulose.

A further object of my invention is to provide a suitable resin for lacquers or plastic compositions containing derivatives of cellulose, which resin is compatible with the other constituents of the lacquers and which produces clear solutions which upon drying form films that are adherent, tough and hard and water-resistant.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the film produced become cloudy and unhomogeneous.

I have found that synethetic resins produced by the polymerization of a product formed by the condensation of an aromatic aldehyde with a ketone are compatible with cellulose acetate, and that when added to lacquers containing cellulose acetate they form clear solutions that upon drying produce clear, hard and tough and firmly adherent films, which films are fast to light and which are water-resistant.

In accordance with my invention, I prepare special synthetic resins by polymerizing in the presence or absence of a catalyst the product formed by the condensation of an aromatic aldehyde with a ketone. These synthetic resins are then used for making a lacquer or plastic composition which contains one or more derivatives of cellulose and a volatile solvent. The lacquer may contain also one or more natural or semi-synthetic resins or gums, one or more plastifiers or softening agents, medium and/or high boiling point solvents and preferably, but not necessarily, some pigments and/or dyes.

Solutions thus formed may be employed as a lacquer or coating composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

The derivative of celulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: acetone, alcohol, benzene, ethyl formal, or ethylene dichloride. Examples of medium and/or high boiling point solvents are ethyl acetate, ethyl lactate, tetrachlorethane, formal glycerol, benzyl alcohol or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, dimethyl phthalate, toluene sulfonamid, mono-methyl xylene sulfonamid, etc. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: Manila acaroides, pontianak, kauri, dammar, rosin and shellac. The semi-synthetic resin, ester gum, which is the glycerol ester of rosin may be also added. If desired, synthetic resins, other than the special resin formed by the condensation of an aromatic aldehyde with a ketone may be employed in conjunction therewith, and examples of these are the fusible and soluble phenol-formaldehyde or diphenylol propane-formaldehyde resins preferably prepared in the presence of acid catalysts.

The special resins employed in this invention may be prepared by the polymerization, in the absence but preferably in the presence of an alkaline catalyst such as sodium hydroxide or potassium hydroxide of the product formed by the condensation of an aromatic aldehyde with a ketone. The aromatic aldehyde may be nuclear substitution products having alkyl, such as methyl or ethyl groups, amino groups or halogen groups therein. While I prefer to employ benzaldehyde as the aromatic aldehyde to be employed as the starting material, other aromatic aldehydes, such as amino benzaldehyde, cinnamic aldehyde, etc., may be employed. Likewise while I prefer to employ acetone as the ketone, other ketones such as methyl ethyl ketone or diethyl ketone may be employed.

In order to form the resin, the product formed by the condensation of the aromatic aldehyde with the ketone, for instance benzal-acetone, is condensed by any suitable means, such as by heating in the presence of an alkali until a resin is formed. As an example of making the resin, the following is given as a mode of preparing a resin from benzal-acetone, which is the product formed by the condensation of benzaldehyde with acetone.

The benzal-acetone may be prepared in any suitable manner. For instance to a mixture of 100 kilograms of benzaldehyde, 100 litres of water and 150 kilograms of acetone, there are added with cooling, 50 litres of an aqueous solution of sodium hydroxide of 10% concentration. The mixture is allowed to stand 3 days with occasional stirring. It is then acidified with acetic acid, the aqueous layer drawn off, and the remaining oil is distilled under vacuum. Thick, yellowish, white needles melting at 41° C. are obtained, which product is benzal-acetone having the following structural formula

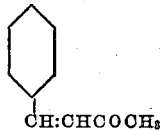

The benzal-acetone is soluble in acetone and is compatible with cellulose acetate giving a clear film which does not discolor after 100 hours exposure in a fadeometer.

The crystals of benzal-acetone are polymerized by heating the same in the presence of a dilute aqueous solution of caustic soda, and produce a light brown hard resin. The resin is compatible with cellulose acetate producing clear films which are light-fast and show good resistance to water.

The following examples serve to illustrate coating or plastic compositions made in accordance with this invention.

*Example I*

A coating composition containing the resin may be made as follows:

|  | Parts by weight |
|---|---|
| Cellulose acetate | 10 |
| Synthetic resin | 1 to 20 |
| Acetone | 100 |

*Example II*

The following is another example of coating composition:

|  | Parts by weight |
|---|---|
| Cellulose acetate | 10 |
| Synthetic resin | 1 to 20 |
| Acetone | 50 |
| Benzene | 25 |
| Alcohol (ethyl or denatured) | 25 |
| Diacetone alcohol | 20 |

*Example III*

The following is an example of a solution that is suitable as an adhesive, and is particularly useful for causing a sheet of celluloid to adhere to surfaces of sheets of glass, cardboard, asbestos, metal, etc.

|  | Parts by weight |
|---|---|
| Cellulose acetate | 20 |
| Synthetic resin | 25 |
| Acetone | 60 |
| Ethyl acetate | 30 |
| Ethyl lactate | 10 |

*Example IV*

Following is an example of a plastic composition:

|  | Parts by weight |
|---|---|
| Cellulose acetate | 100 |
| Synthetic resin | 40 |
| Monomethyl xylene sulfonamid | 10 |
| Alcohol | 50 |
| Benzene | 50 |

*Example V*

The following is an example that may be employed for making artificial yarn by extruding through the orifices of a spinneret into a heated, evaporative atmosphere:

|  | Parts by weight |
|---|---|
| Cellulose acetate | 100 |
| Synthetic resin | 20 |
| Acetone | 400 |

*Example VI*

The following is a formula for pigmented lacquer:

|  | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

*Example VII*

The following examples are given to illustrate the use of a synthetic resin in connection with cellulose nitrate for various purposes:

(a) Coating composition may contain:

| Cellulose nitrate | 6 kilograms |
|---|---|
| Camphor | 2 kilograms |
| Diethyl phthalate | 2 kilograms |
| Synthetic resin | 10 kilograms |
| Benzene | 20 liters |
| Alcohol | 20 liters |
| Butyl alcohol | 20 liters |
| Butyl acetate | 20 liters |
| Ethyl acetate | 30 liters |

(b) An adhesive solution suitable for use in the preparation of laminated glass may contain:

| | |
|---|---|
| Cellulose nitrate | 0.4 kilograms |
| Camphor | 0.1 kilograms |
| Dibutyl phthalate | 0.1 kilograms |
| Synthetic resin | 1.0 kilograms |
| Benzene | 20 liters |
| Alcohol | 10 liters |
| Butyl alcohol | 20 liters |
| Butyl acetate | 20 liters |
| Ethyl acetate | 30 liters |

In the foregoing examples, the cellulose acetate may be replaced by cellulose propionate, cellulose butyrate, etc. Either the cellulose acetate or the cellulose nitrate may be replaced by cellulose ethers.

The term "alkali" as used hereinafter in the claims is to be construed as meaning a chemical compound which dissolves in water without decomposition and which ionizes in aqueous solution to form hydroxyl ions.

It is to be understood that the foregoing detailed description is given merely by way of illustration, and that many variations may be made therein, without departing from the spirit of my invention.

Having described my invention, what I claim and desire to secure by Letters Patent is:

1. Method of preparing a synthetic resin comprising heating in the presence of a dilute aqueous solution of an alkali a product formed by the condensation of an aromatic aldehyde with acetone until resin formation occurs.

2. Method of preparing a synthetic resin comprising heating benzal-acetone in presence of a dilute aqueous solution of an alkali until resin formation occurs.

GEORGE W. SEYMOUR.